(No Model.)

W. O. RUTLEDGE.
CAR COUPLING.

No. 384,217. Patented June 5, 1888.

WITNESSES:

INVENTOR:
W. O. Rutledge
BY Munn & Co
ATTORNEYS.

UNITED STATES PATENT OFFICE.

WILLIAM O. RUTLEDGE, OF GALVESTON, TEXAS.

CAR-COUPLING.

SPECIFICATION forming part of Letters Patent No. 384,217, dated June 5, 1888.

Application filed December 28, 1887. Serial No. 259,218. (No model.)

*To all whom it may concern:*

Be it known that I, WILLIAM O. RUTLEDGE, of Galveston, in the county of Galveston and State of Texas, have invented a new and Improved Car-Coupling, of which the following is a full, clear, and exact description.

This invention relates to an improvement in car-couplings, and has for its object to provide a coupling by means of which the link will be held up and guided into the draw-head, and the coupling-pin held in position to be coupled and automatically thrown into engagement with the link.

The invention consists in a car-coupling constructed and arranged as hereinafter described and claimed.

Reference is to be had to the accompanying drawings, forming a part of this specification, in which similar figures of reference indicate corresponding parts in both the views.

Figure 1:
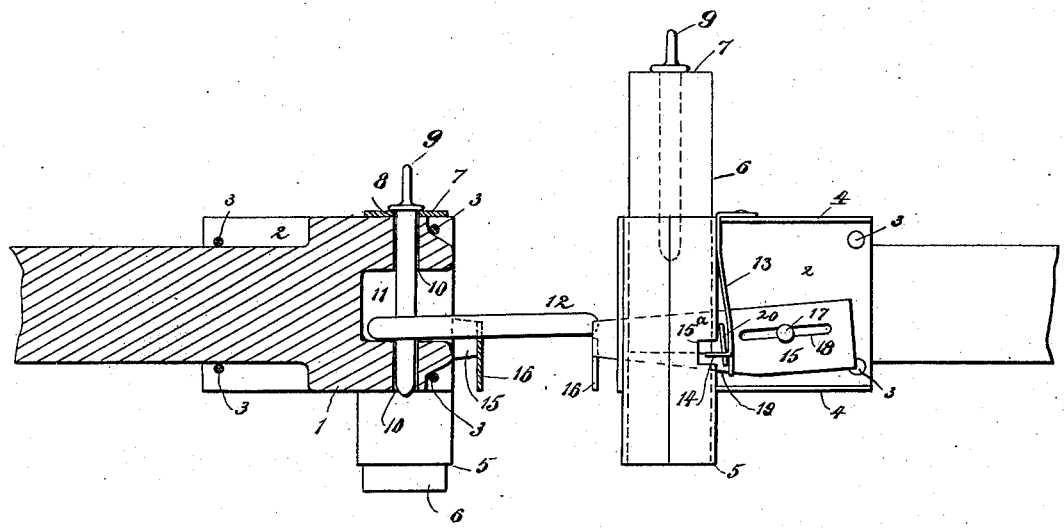
Figure 2:
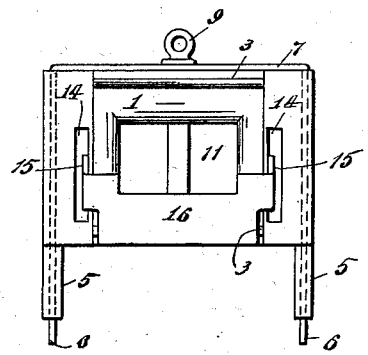

Figure 1 is a side view of two draw-heads in position to be coupled, one of the draw-heads being in vertical central section; and Fig. 2 is a front view of the invention.

In the construction of the invention a draw-head, 1, is provided with side metallic casings, 2, secured thereto by connecting-bolts 3, riveted thereto, or fastened in any suitable manner. The top and bottom of the casings 2 are formed with flanges 4, which are cut away at the forward part of casing 2, and through said cut-away or recessed portions are secured in any suitable manner guides 5 for the depending arms 6 of a U-shaped frame, 7, having a hole, 8, in which is inserted a coupling-pin, 9. The hole 8 is in line with the holes 10 in draw-head 1, so that when frame 7 has dropped the pin 9 will extend through holes 10 and across recess 11, which recess receives the end of a link, 12. The frame 7 is held in elevated position, as shown in right-hand side of Fig. 1, by means of a spring-catch, 13, on each casing 2, having its bent end 14 projecting through a notch, 15ª, in guide 5, and beneath depending arm 6 when raised. The front part of casings 2 is provided with a slot, 14, through which passes a leg, 15, of the U-shaped piece 16, having its cross-bar extending over the lower part of draw-head 1. The legs 15 are connected to casings 2 by pins 17, projecting through slots 18, and are adapted to slide thereon. The forward portions of legs 15 are beveled, as at 19, so that the cross-bar of piece 16 is lowered as the latter is pushed back by the piece 16 on opposite draw-head, thereby guiding the link 12 into recess 11 and into position for pin. A lip or projection, 20, on casings 2 acts on spring-catches 13 to release bent end 14 from engagement with arm 6. In place of the spring-catches 13 an arm similar in shape to catch 13 may be loosely pivoted to the side of casing 2, so that its bent end will hang by the weight of the arm in the path of arm 6 and support the latter, and be moved out of the way similarly to catch 13.

The parts heretofore described may be made of iron or steel or any other suitable metal. The U-shaped parts 6 and 15 may be made of well-tempered steel, and the fastenings 3 should be heavy iron screw-bolts secured on the draw-heads and bars so tight and immovable as to enable the casing 2 to resist any jar or shock and remain in position.

The operation of the device is as follows: The parts being in position, as shown in Fig. 1, with U-shaped frame 7 supporting a pin, 9, above recess 11, and held in elevated position by catches 13 and a pin, 9, holding a link, 12, which is supported by U-shaped pieces 16, the link 12 will be in position to be guided over the opposite U-shaped piece 16 and into recess 11. Upon the draw-heads being brought together the piece 16 on the right hand in Fig. 1 will be pushed back and the projection 20 act on catch 13 to release its bent end from arm 6, thereby causing the frame 7 to fall and carry pin 9 into holes 10 and into engagement with link 12.

The parts may be uncoupled by removing link 9 or by raising it in resetting the coupling when the arms 6 are moved up into engagement with catches 13.

By means of this device cars may be coupled automatically, thereby avoiding any danger existing in coupling by hand. The coupling is also effected with certainty, there being no opportunity for the link and pin failing to engage each other.

I do not intend to limit myself to the precise construction of parts, as they may be varied without departing from the principle of my invention.

Having thus fully described my invention, I claim as new and desire to secure by Letters Patent—

1. In a car-coupling, a vertical movable U-shaped frame mounted in guides on a draw-head and adapted to support a coupling-pin, a horizontal movable U-shaped piece mounted in supports on the draw-head and extending across the lower edge of link-recess in draw-head, and spring-catches on the draw-head adapted to engage the coupling-pin frame and to be thrown out of engagement by the horizontal U-shaped piece, substantially as shown and described.

2. In a car-coupling, a draw-head, 1, having casings 2, with guides 5, having notches 15$^a$, and spring-catches 13, U-shaped coupling-pin frame, sliding U-shaped piece 16, having slots 18, engaging pins 17, and the projections 20, substantially as described.

WILLIAM O. RUTLEDGE.

Witnesses:
T. G. BETTISON,
WILLIAM J. JONES.